E. R. ORBIN.
BARGE UNLOADING APPARATUS.
APPLICATION FILED AUG. 1, 1912.
1,055,788.
Patented Mar. 11, 1913.
7 SHEETS—SHEET 4.
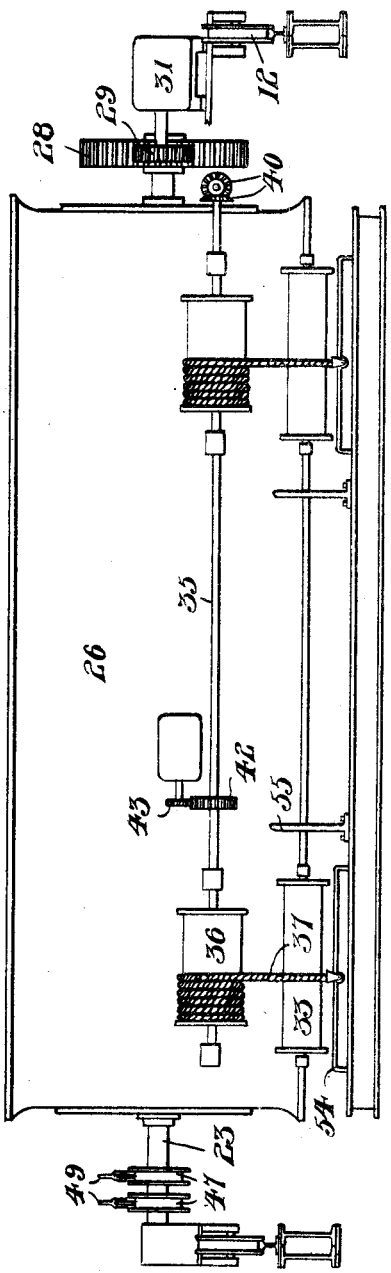
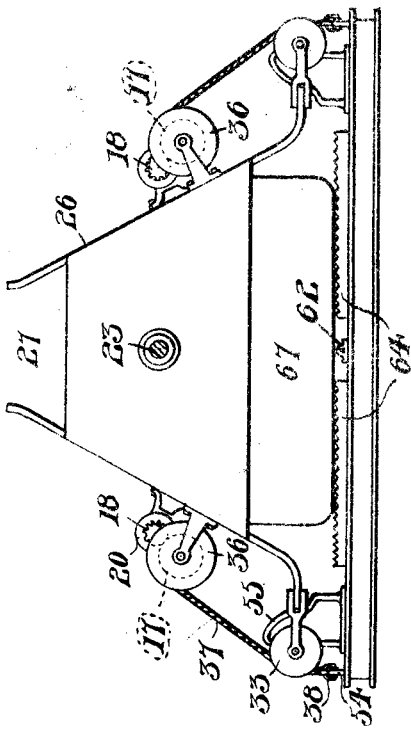
WITNESSES
INVENTOR
E. R. Orbin
Att'ys E. R. ORBIN.
BARGE UNLOADING APPARATUS.
APPLICATION FILED AUG. 1, 1912.
1,055,788.
Patented Mar. 11, 1913.
7 SHEETS—SHEET 5.
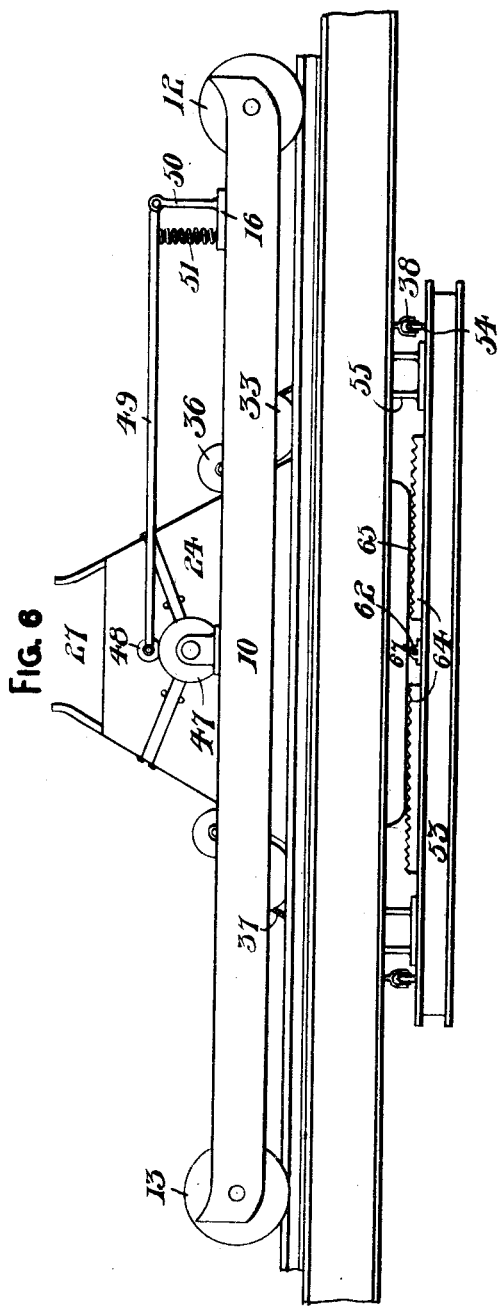
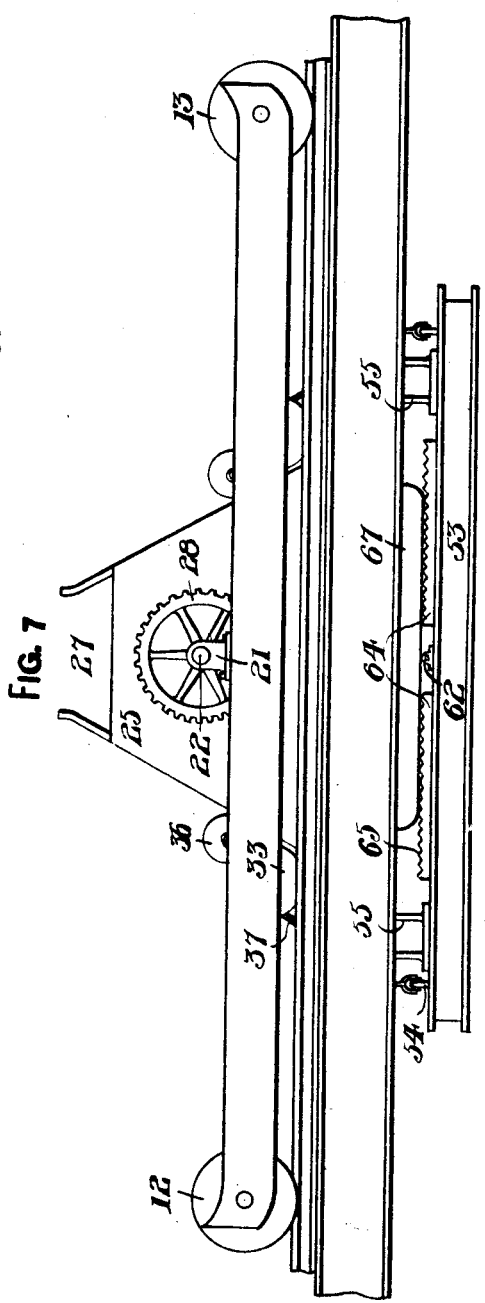
WITNESSES
INVENTOR
E. R. Orbin

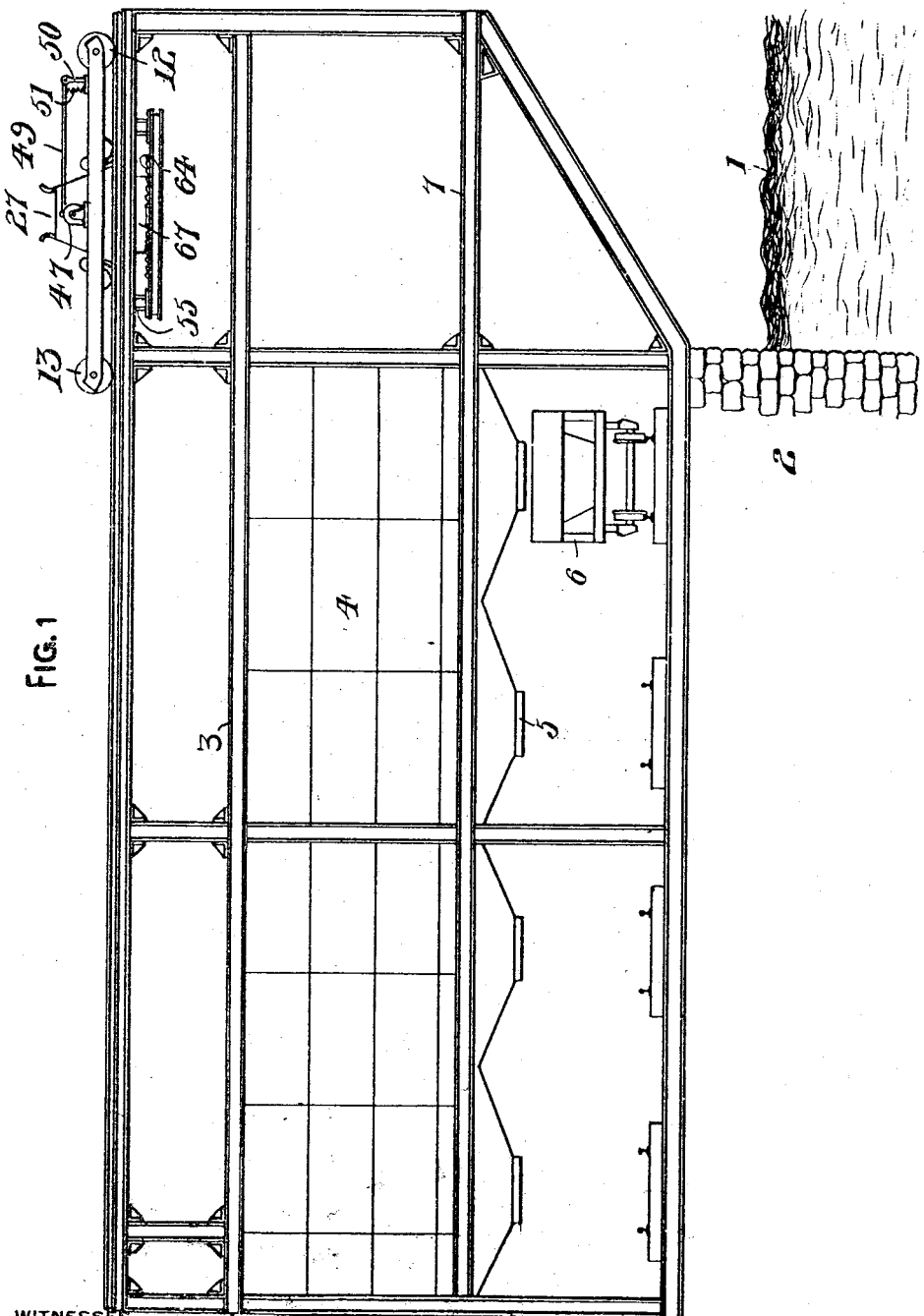

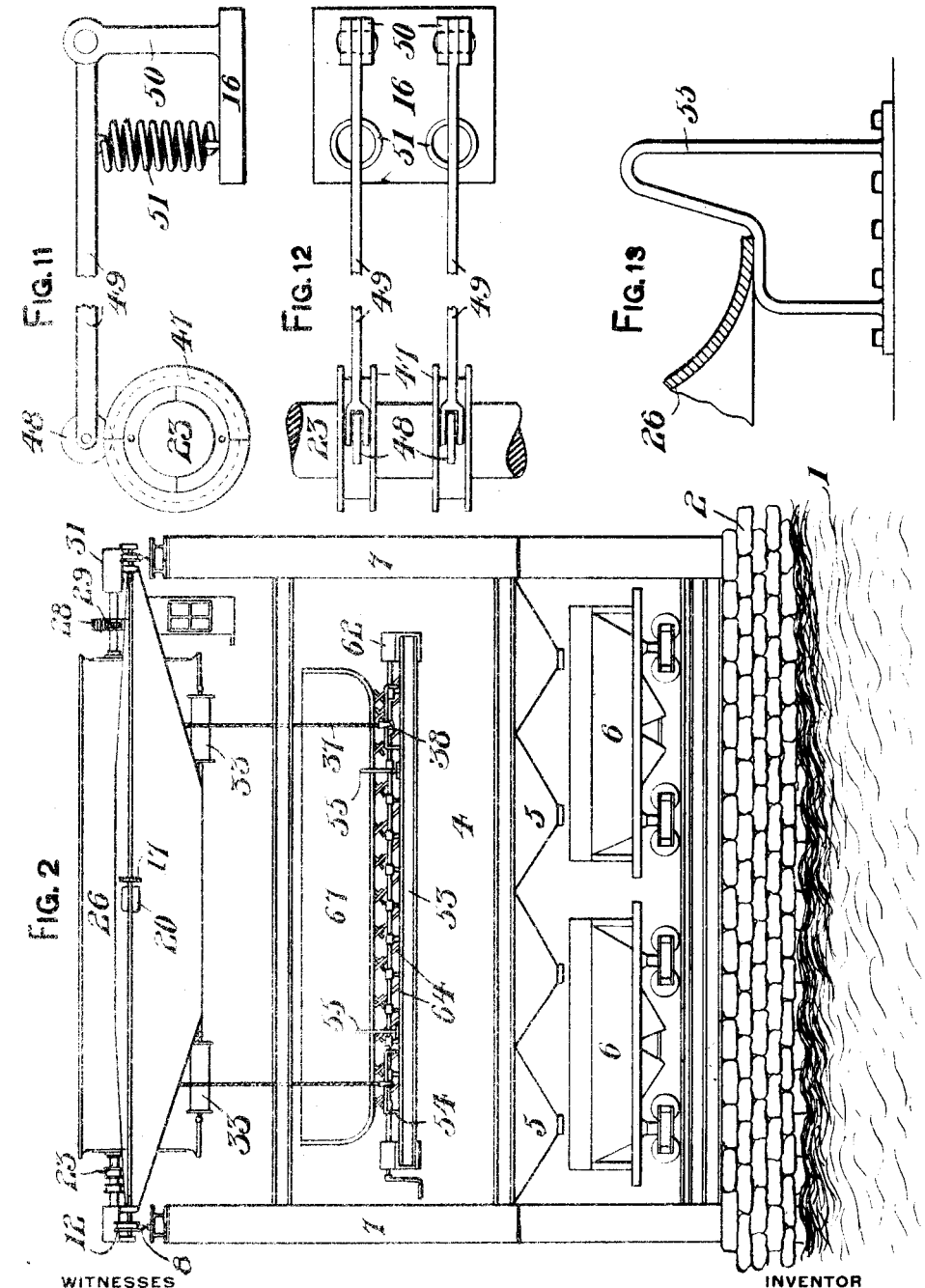

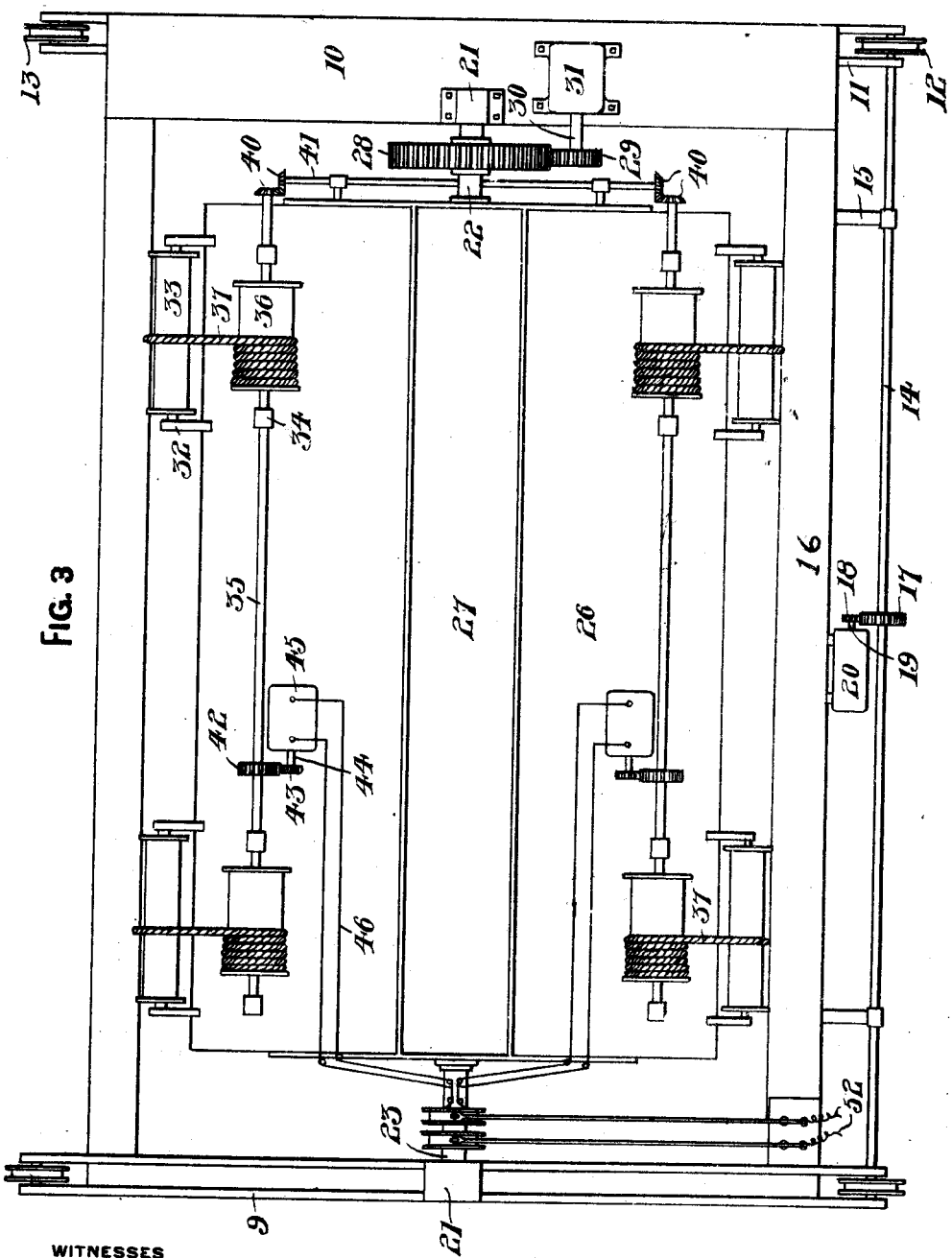

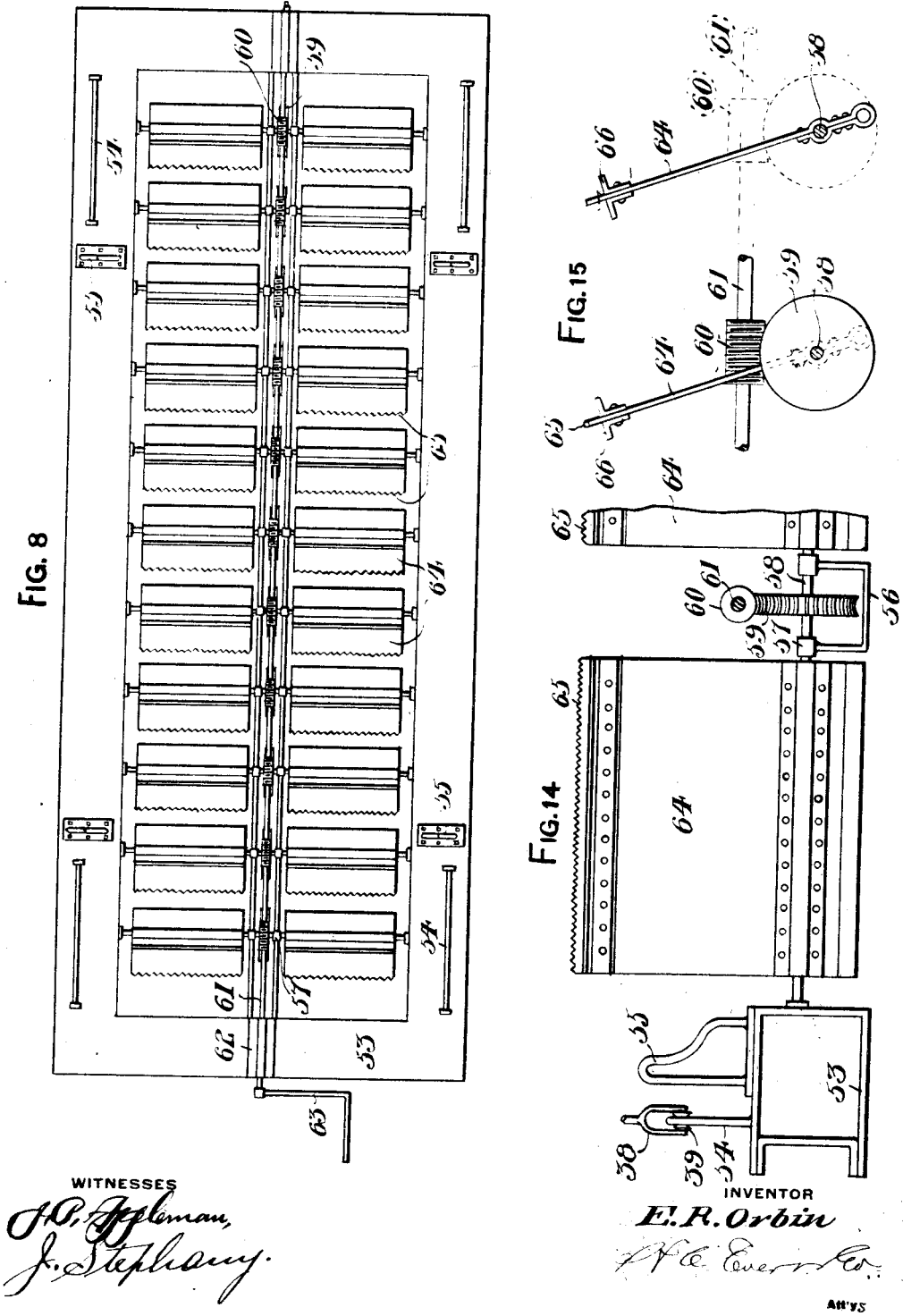

E. R. ORBIN.
BARGE UNLOADING APPARATUS.
APPLICATION FILED AUG. 1, 1912.
1,055,788.
Patented Mar. 11, 1913.
7 SHEETS—SHEET 7.
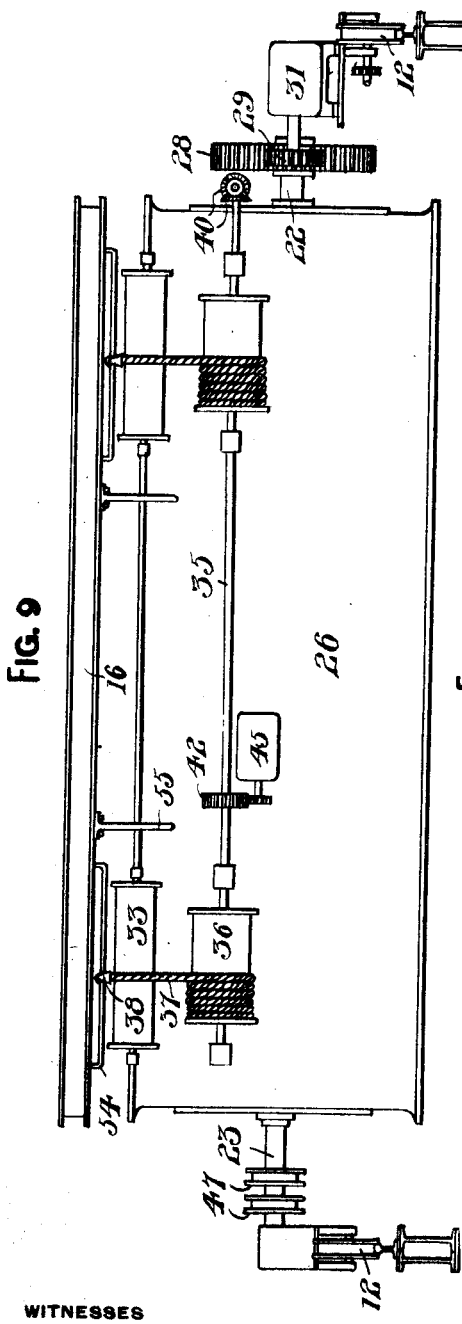
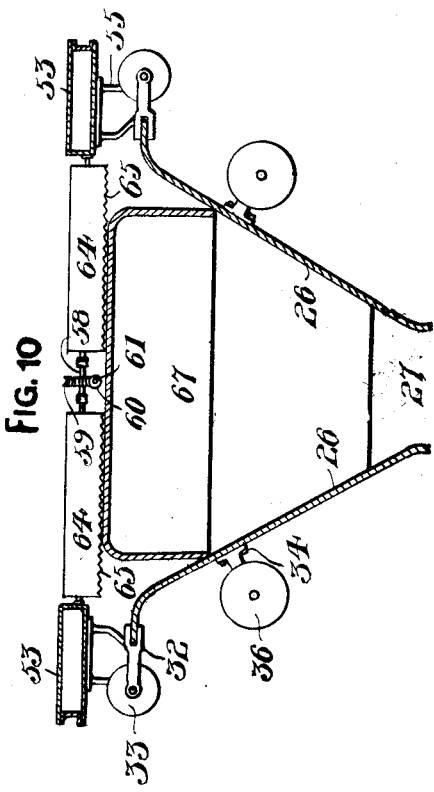
WITNESSES
INVENTOR
E. R. Orbin
ATTORNEYS

UNITED STATES PATENT OFFICE.

EDWIN R. ORBIN, OF DUQUESNE, PENNSYLVANIA.

BARGE-UNLOADING APPARATUS.

1,055,788.   Specification of Letters Patent.   Patented Mar. 11, 1913.

Application filed August 1, 1912. Serial No. 712,705.

*To all whom it may concern:*

Be it known that I, EDWIN R. ORBIN, a citizen of the United States of America, residing at Duquesne, in the county of Allegheny and State of Pennsylvania, have invented certain new and useful Improvements in Barge-Unloading Apparatus, of which the following is a specification, reference being had therein to the accompanying drawing.

This invention relates to a barge unloading apparatus, and more particularly to an apparatus for elevating barges and other vessels for removing the contents of the same, thereby obviating the necessity of using clam buckets, conveyers and other devices that require considerable time and labor, besides not completely emptying a vessel, as it is impossible for certain parts of the vessel to be reached by a bucket or conveyer.

The primary object of my invention is to provide a shore or wharf apparatus that extends above a body of water to expeditiously and economically elevate, carry the same above a dumping ground, bin or other receptacle and invert the barge to deposit the contents thereof.

Another object of this invention is to provide an apparatus embodying positive and reliable means for gripping a barge or other vessel whereby it can be moved, inverted and safely restored to the body of water from which it has been removed.

A further object of this invention is to furnish an apparatus of the above type with an invertible discharge spout against which a vessel or receptacle can be held during the inverting operation, whereby the contents or dumpable material within the vessel or receptacle will be guided into a bin or other inclosure, from which quantities can be easily and quickly removed from time to time.

A still further object of this invention is to provide an electrically operated barge unloading apparatus that can be advantageously used along the Mississippi and Ohio Rivers and their tributaries for facilitating the unloading of coal barges at industrial plants located along the shores of the rivers.

With the above and other objects in view the invention resides in the novel construction, combination and arrangement of parts to be hereinafter more specifically described and then claimed Reference will now be had to the drawings wherein like numerals denote corresponding parts throughout, in which:—

Figure 1 is a side elevation of a barge unloading apparatus in accordance with this invention, Fig. 2 is an end view of the same showing a barge in an elevated position, Fig. 3 is an enlarged plan of a crane forming part of the apparatus, Fig. 4 is an end view of the crane showing the invertible discharge spout in an upright position, Fig. 5 is a side elevation of the invertible discharge spout of the crane, Fig. 6 is an enlarged elevation of one side of the crane, Fig. 7 is a similar view of the opposite side of the crane, Fig. 8 is an enlarged plan of an elevator forming part of the apparatus, Fig. 9 is an end view of the crane showing the discharge spout in an inverted position, Fig. 10 is a cross sectional view of the same, Fig. 11 is an enlarged side elevation of a yieldable contact arm, Fig. 12 is a plan of the same, Fig. 13 is an enlarged side elevation of a brace. Fig. 14 is an enlarged end view of a portion of the elevator, and Fig. 15 is an enlarged longitudinal sectional view of a portion of the same.

Reference first being had to Figs. 1 and 2, the reference numeral 1 denotes a body of water, as a river and 2 a shore or wharf upon which there is erected a structural steel overhanging frame work 3 supporting elevated or superimposed bins 4 having discharge openings 5 beneath which travel cars 6 or other conveyers. The frame work 3 has an overhanging portion 7 extending over the body of water 1 and said frame work has the top thereof provided with parallel rails 8 constituting a track for a crane.

The crane comprises longitudinal side frames 9 and 10 provided with bearings 11 for flanged revoluble wheels 12 and 13 that travel upon the rails 8. The wheels 12 are mounted upon a driven shaft 14 journaled in bearings 15 carried by a transverse beam 16 connecting the side frames 9 and 10. The shaft 14 has a large gear wheel 17 meshing with a small gear wheel 18 mounted upon the armature shaft 19 of an electric motor 20. The motor 20 receives its power from a suitable source of electrical energy and the operation of said motor is controlled by the attendant or operator of the unloading apparatus. It is through the medium of this motor that the crane can be shifted longitudinally of the frame work 3.

The side frames 9 and 10 of the crane are provided with bearings 21 and extending into said bearings are the trunnions 22 and 23 of an invertible discharge spout, comprising end walls 24 and 25 and inclined or converging side walls 26. The walls 26 are of a greater depth than the end walls 24 and 25 thereby providing a discharge opening 27.

The trunnion 22 has a large gear wheel 28 meshing with a small gear wheel 29 mounted upon the armature shaft 30 of an electric motor 31. The motor 31 is carried by the side frame 10 and receives its power from a suitable source of electrical energy and is controlled similarly to the motor 20. It is through the medium of the motor 31 that the spout supported by the trunnions 22 and 23 can be inverted.

The lower edges of the invertible spout are provided with sets of bearings 32 for idler rolls 33 and the outer sides of the walls 26 are provided with bearings 34 for longitudinal shafts 35. Mounted upon the shafts 35 are drums 36 and attached to said drums and adapted to be wound thereon are hoisting cables 37 that pass over the idler rolls 33 and the lower ends thereof are provided with stirrups 38 supporting anti-friction rollers 39.

The shafts 35 are geared together through the medium of beveled gear wheels 40 and a longitudinal shaft 41 arranged at one end of the invertible spout. The shafts 35 have large gear wheels 42 meshing with small gear wheels 43 mounted upon the armature shafts 44 of electric motors 45. The electric motors 45 are carried by the side walls 26 of the invertible spout and are connected by wires 46 to contact wheels 47 mounted upon the trunnion 23 of the invertible discharge spout. Engaging the contact wheels 47 are anti-frictional contact wheels 48, journaled in the outer ends of arms 49 pivotally mounted in bearings 50, carried by the beam 16. The wheels 48 of the arms 49 are normally retained in engagement with the wheels 47 by coiled retractile springs 51 connecting said arms and the beam 16. This construction is best shown in Figs. 3, 11 and 12. Wires 52 from a suitable source of electrical energy are connected to the arms 49 and the operation of the motors 45 is controlled by the attendant of the apparatus. It is through the medium of the elements 32 to 52 inclusive that an elevator can be hoisted and lowered relatively to the invertible discharge spout.

The elevator forming part of the apparatus is best shown in Figs. 2, 4, 8, 14 and 15. The elevator comprises a rectangular frame 53, preferably made of channel bars, as shown in Fig. 14. The top of the frame is provided with longitudinal yokes 54 that are engaged by the antifriction rollers 39 of the stirrups 38, this means of fastening the elevator to the hoisting cables 37 allowing the elevator to shift relatively to the invertible discharge spout. The top of the elevator has braces 55 that engage the longitudinal edges of the side walls 26 of the spout, whereby the elevator will be braced relatively to the invertible discharge spout, when elevated in engagement therewith, as shown in Figs. 4 and 5.

The elevator has a central longitudinal channel beam 56 provided with bearings 57 and journaled in said bearings and the frame 53 are a plurality of equally spaced transverse rock shafts 58. These shafts are provided with gear wheels 59 intermediate the bearings 57, said gear wheels meshing with worms 60 mounted upon a longitudinal shaft 61, journaled in bearings 62, carried by the ends of the frame 53. The ends of the shaft 61 are provided with elongated cranks 63 whereby the shaft 61 can be rotated, when the elevator is submerged, to rock the shafts 58.

Mounted upon each shaft is a set of holding blades 64 having the upper edges thereof serrated or toothed, as at 65 and provided with longitudinal angle bars 66 that coöperate with the serrated or toothed edges of the blades in gripping the bottom of a barge 67 or other vessel, to prevent the barge from becoming accidentally displaced relatively to the elevator. As barges are generally made of wood, the serrated or toothed blades will engage in the bottom of the barge and firmly hold the same, and when barges are encountered that are made of metal the edges of the holding blades 64 can be provided with means for frictionally holding a steel barge.

Operation: With the crane positioned over the overhanging portion 7 of the framework 3, the elevator can be lowered into the body of water 1 and then a barge or other vessel moved to a position above the elevator. The crank 63 can then be moved to rock the shafts 58 and swing the holding blades 64 to the angularly disposed position, shown in Figs. 2 and 15, thereby gripping the bottom of the barge 67. The motors 45 can then be placed in operation to raise the elevator and place the upper edges of the barge 67 in engagement with the invertible discharge spout, as shown in Figs. 6 and 7. The motor 20 is then placed in operation to move the crane to a position above one of the bins 4. Next, the motor 31 is placed in operation to invert the discharge spout and the barge held in engagement therewith. The contents of the barge can be discharged, as shown in Fig. 0, whereby the contents will be deposited in the bin beneath the invertible discharge spout. From the bin a predetermined quantity can be obtained and transported to a suitable point by the car 6. After the invertible discharge spout has been placed in an upright position, the crane can be shifted to the overhanging portion 7 of the frame work 3, the elevator lowered and the barge released.

From the foregoing it will be observed that a barge of a large size can be easily and quickly manipulated in connection with the apparatus and completely and thoroughly emptied and restored to the body of water, with the apparatus in position to receive another barge.

What I claim is:—

1. A barge unloading apparatus embodying a frame work, a crane movable upon said frame work, a discharge spout invertibly supported by said crane, an elevator suspended from said spout and adapted to be lowered to receive a barge and means for raising and lowering said elevator to and from said spout.

2. A barge unloading apparatus embodying a frame work, a crane movable upon said frame work, a discharge spout invertibly supported by said crane, an elevator suspended from said spout and adapted to be lowered to receive a barge, means for raising and lowering said elevator to and from said spout, and means carried by said elevator and adapted to hold a barge thereon.

3. A barge unloading apparatus comprising a movable crane, a discharge spout invertibly carried thereby, an elevator suspended from said spout, and means for raising and lowering said elevator to and from said spout.

4. A barge unloading apparatus comprising a movable crane, a discharge spout invertibly carried thereby, an elevator suspended from said spout, means for raising and lowering said elevator to and from said spout, and means carried by said elevator for holding the barge thereon.

5. A barge unloading apparatus comprising a movable crane, a discharge spout invertibly carried thereby, means carried by said crane for inverting said spout, a barge elevator, and means for raising and lowering said elevator to and from said spout.

6. A barge unloading apparatus comprising a movable crane, an invertible discharge spout carried thereby, means carried by said crane for inverting said spout, a barge elevator movable to and from said spout, and means carried by said spout for raising and lowering said elevator.

7. A barge unloading apparatus comprising a movable crane, an invertible discharge spout carried thereby, means carried by said crane for inverting said spout, a barge elevator movable to and from said spout, means carried by said spout for raising and lowering said elevator, and means carried by said elevator and including blades adapted to hold a barge thereon.

8. A barge unloading apparatus comprising a frame work, a crane movable upon said frame work, a discharge spout invertibly carried by said crane, an elevator suspended from said spout, means carried by said spout and including cables for raising and lowering said elevator, and means carried by said elevator and including blades for holding a barge thereon.

9. A barge unloading apparatus embodying a frame work, an electrically operated crane carried thereby, an electrically operated spout invertibly carried by said crane, an electrically operated elevator suspended from said spout, means for raising and lowering said elevator to and from said spout, and blades carried by said elevator for retaining a barge thereon.

In testimony whereof I affix my signature in the presence of two witnesses.

EDWIN R. ORBIN.

Witnesses:
 JOE WALLENSAK,
 JOE GRETZ.